Figure 1:
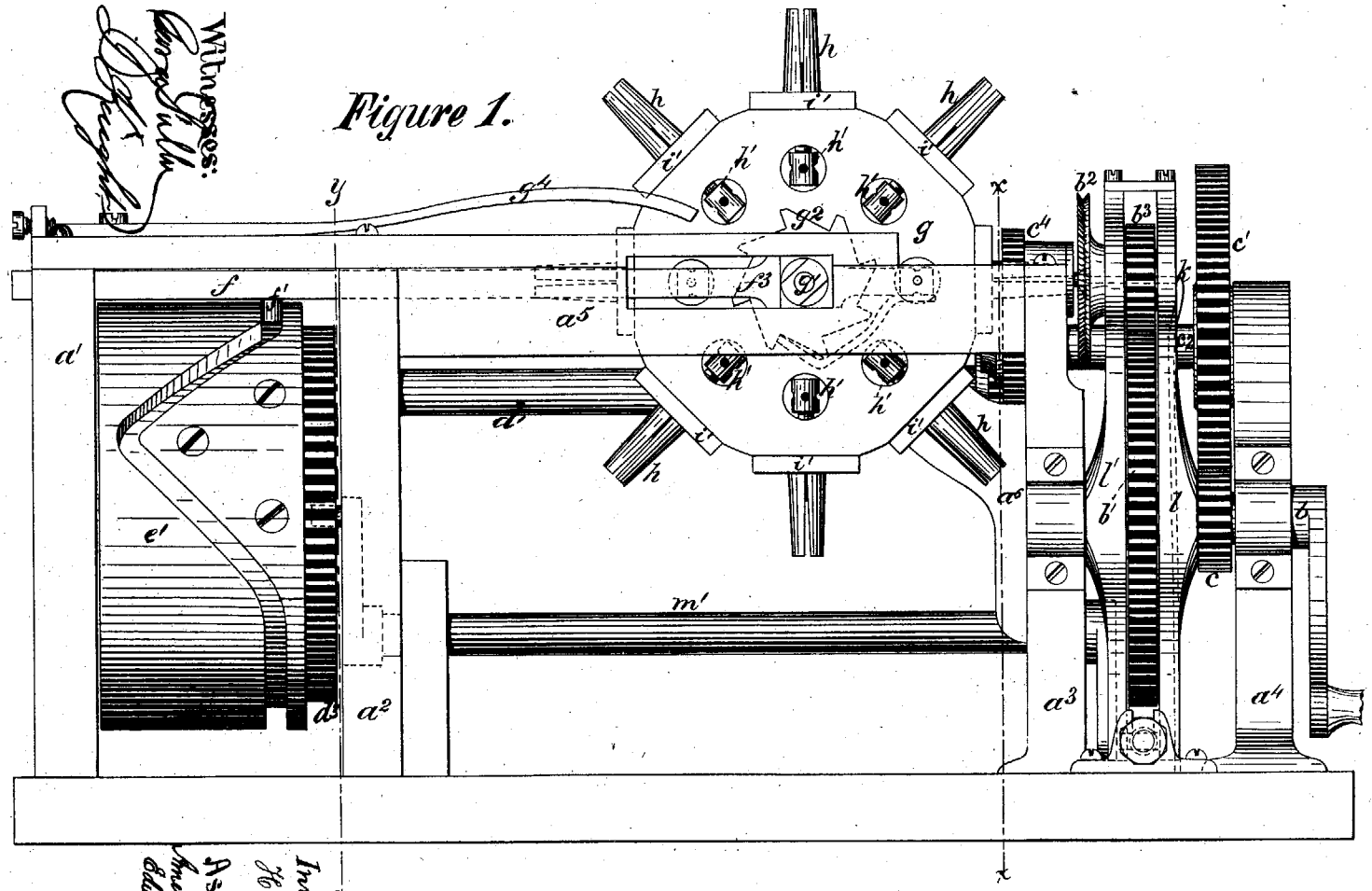

4 Sheets—Sheet 1.

H. A. HARVEY.

Assignor by mesne assignments to THE AMERICAN SCREW CO.

MACHINES FOR SHAVING THE HEADS OF WOOD SCREWS.

No. 7,534. Reissued Feb. 27, 1877.

Witnesses:
Geo. Fuller
D. Knight

Inventor
H. A. Harvey
Assignee:
American Screw Co.
Edwin G. Arnold Atty

N. PETERS, PHOTO-LITHOGRAPHER, WASHINGTON, D. C.

H. A. HARVEY.

Assignor by mesne assignments to THE AMERICAN SCREW CO.

MACHINES FOR SHAVING THE HEADS OF WOOD SCREWS.

No. 7,534. Reissued Feb. 27, 1877.

Inventor
H. A. Harvey

Assignee:
American Screw Co.
Edwin G. Angell Atty.

Witnesses:
Geo. Gulin
S. Knight

N. PETERS, PHOTO-LITHOGRAPHER, WASHINGTON, D. C.

H. A. HARVEY.

Assignor by mesne assignments to THE AMERICAN SCREW CO.

MACHINES FOR SHAVING THE HEADS OF WOOD SCREWS.

No. 7,534. Reissued Feb. 27, 1877.

Witnesses:
George Fulton
J. Knight.

Inventor
H. A. Harvey.

Assignee:
American Screw Co.
Edwin G. Angell Pratt.

N. PETERS, PHOTO-LITHOGRAPHER, WASHINGTON, D. C.

4 Sheets—Sheet 4.

H. A. HARVEY.

Assignor by mesne assignments to THE AMERICAN SCREW CO.

MACHINES FOR SHAVING THE HEADS OF WOOD SCREWS.

No. 7,534. Reissued Feb. 27, 1877.

Witnesses:
Geo. Fulton
C. Knight.

Inventor
H. A. Harvey

Assignee:
American Screw Co.
Edwin G. Angell Supt

N. PETERS, PHOTO-LITHOGRAPHER, WASHINGTON, D. C.

UNITED STATES PATENT OFFICE

HAYWARD A. HARVEY, OF NEW YORK, N. Y., ASSIGNOR, BY MESNE ASSIGNMENTS, TO THE AMERICAN SCREW COMPANY.

IMPROVEMENT IN MACHINES FOR SHAVING THE HEADS OF WOOD-SCREWS.

Specification forming part of Letters Patent No. 44,723, dated October 18, 1864; reissue No. 7,534, dated February 27, 1877; application filed January 22, 1877.

*To all whom it may concern:*

Be it known that HAYWARD A. HARVEY, of New York, N. Y., did invent certain Improvements in Machines for Manufacturing Wood-Screws, of which the following is a specification:

These improvements relate to that class of screw-machines in which the screw-blanks are successively inserted in receivers arranged radially upon a hub which has an intermittent rotating motion and a reciprocating sliding motion, these motions being for the purposes, first, of presenting the receivers in convenient position for permitting the insertion of the blanks; and, secondly, for successively transferring the blanks deposited in the receivers into suitable position to be operated upon by the mechanism which cuts them; and, finally, for removing the blanks from the place where they are cut to a position where they are discharged from the receivers.

This invention consists, primarily, in making the receivers above referred to capable of rotation upon their own axes, and thus providing for the subjection of the receivers to three kinds of motion, to wit: first, a reciprocating motion in a right line, when the hub which carries them reciprocates; secondly, an intermittent rotation around the axis of the hub as the hub rotates; and, thirdly, rotation upon their own axes independently of the hub upon which they are arranged.

This invention further consists in the adaptation of the rotating receivers arranged on an intermittently-rotating sliding hub to machines for shaving the heads of screw-blanks.

For this purpose devices are provided for causing the receivers to gripe the blanks, and for successively revolving the receivers at more or less speed, while they are successively in position to submit the heads of the blanks contained in them either to the action of a circular cutter or milling-tool revolving at different rates of speed, or to the action of the ordinary V-tool having the usual radial feed.

The accompanying drawings represent a machine for shaving the heads of wood-screws, provided with an intermittently rotating and reciprocating hub having eight receivers arranged radially in its periphery.

Figure 2:
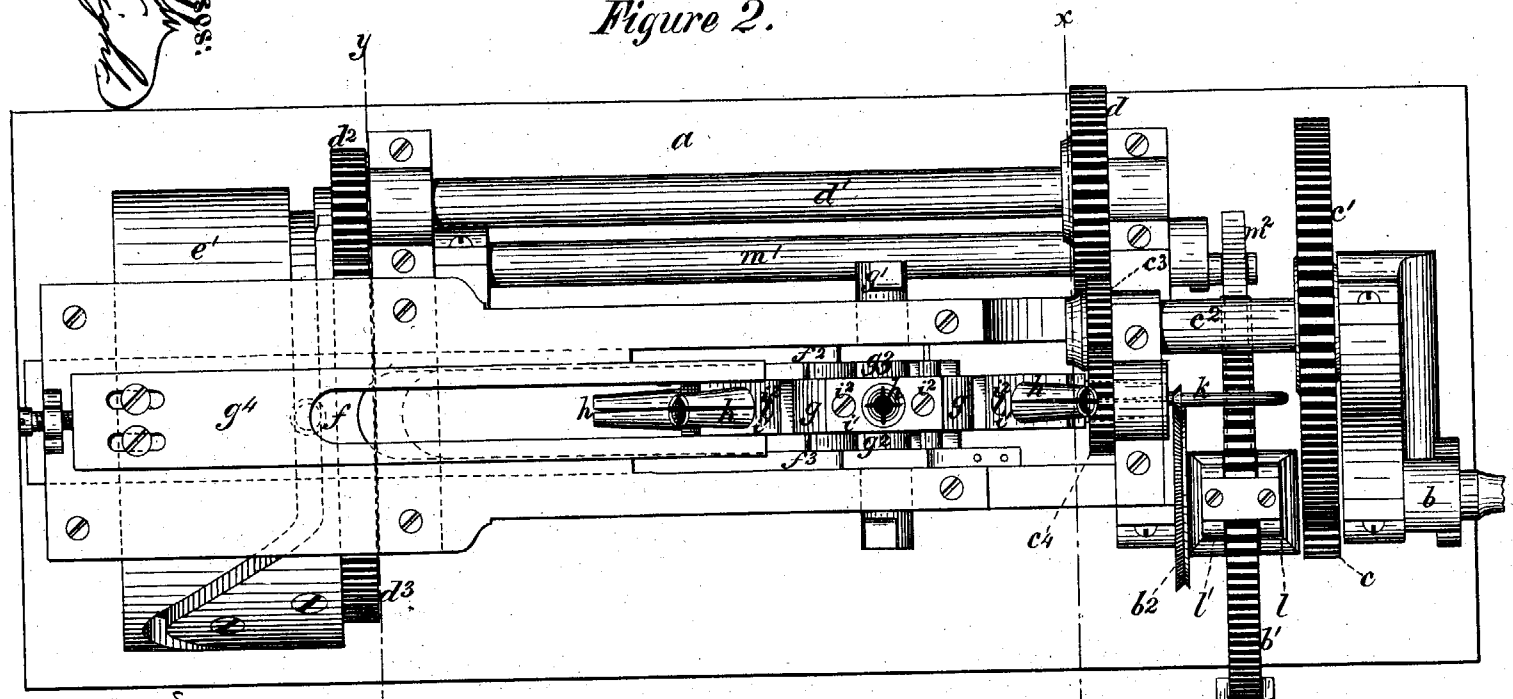
Figure 1:
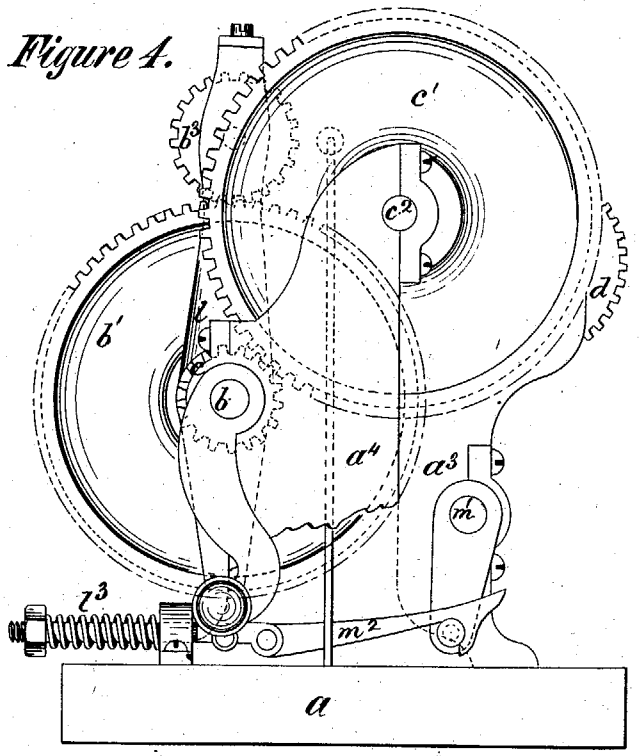
Figure 3:
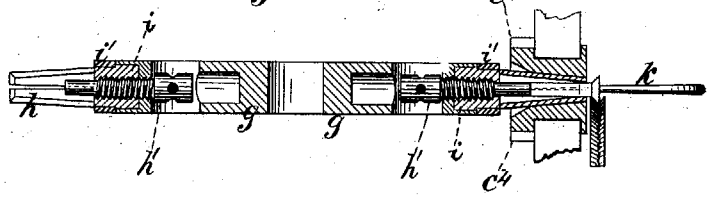
Figure 6:
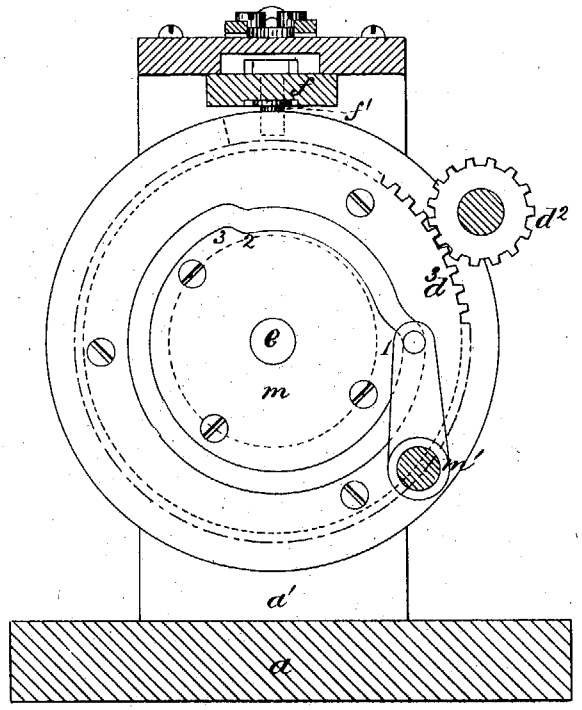
Figure 5:
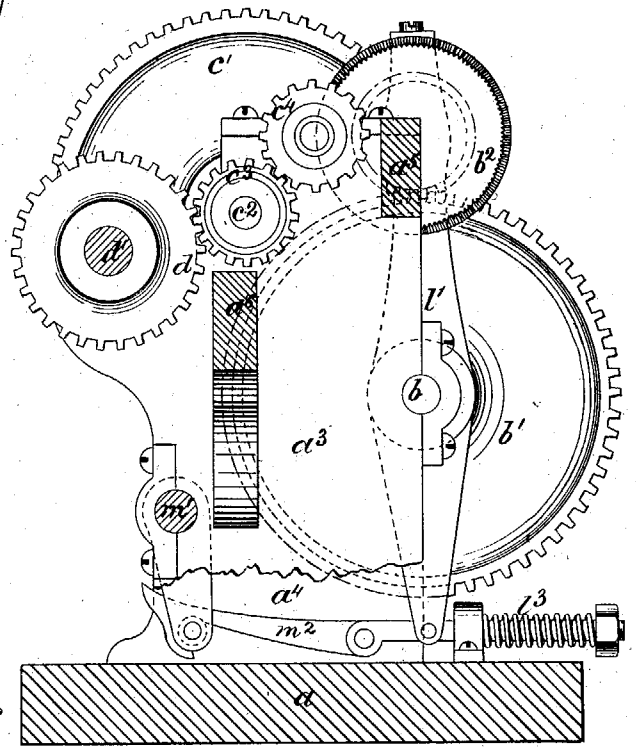

The drawings are as follows: Figure 1 is a front elevation of the machine. Fig. 2 is a top view of the same. Fig. 3 is a transverse section of the hub carrying the receivers, and also of a revolving collar for causing the receivers to gripe the blanks, and also for causing the receivers to revolve. Fig. 4 is an end elevation of the machine. Fig. 5 is a cross-section through the line $x\ x$ on Figs. 1 and 2. Fig. 6 is a cross-section through the line $y\ y$ on Figs. 1 and 2.

The frame of the machine consists of a bed-plate, $a$, from which arise four uprights, $a^1$, $a^2$, $a^3$, and $a^4$, the two inner uprights $a^2$ and $a^3$ being joined together by bridges $a^5$ and $a^6$. The driving-shaft $b$ carries a large spur-wheel, $b^1$, which drives the cutter $b^2$ by the pinion $b^3$, and a small spur-wheel, $c$, which meshes into the larger wheel $c^1$ upon the short counter-shaft $c^2$. On the inner end of this shaft is another small spur-wheel, $c^3$, which, upon one side, meshes into teeth upon the periphery of an annular wheel, $c^4$, the latter being the revolving collar into which the receivers are successively forced, and by which the receivers are made to revolve, and also to gripe the blanks they contain. On the other side the spur-wheel $c^3$ meshes into the wheel $d$ upon the long counter-shaft $d^1$, which carries upon its opposite end a pinion, $d^2$, meshing into the gear $d^3$ upon the cam-shaft $e$, which is so speeded as to make one revolution each time a blank is shaved. By the movement of the cam $e'$ a backward and forward sliding motion is imparted at the proper time to a carriage, $f$, by means of the cam-pin $f^1$. This carriage, which rests upon the top of the uprights $a^1$ and $a^2$, and upon the bridges $a^5$ and $a^6$, has two arms, $f^2$ and $f^3$, which embrace the hub or carrying-wheel $g$ and support the shaft $g^1$, upon which the carrying-wheel is mounted.

On each side of the carrying-wheel are ratchet-wheels $g^2$ and $g^3$, having the same number of teeth as there are receivers upon the carrying-wheel. The forward movement of the carriage pushes one of the receivers into the revolving collar $c^4$. When the carriage is drawn partly back the ratchets $g^2$ and $g^3$ strike the stationary spring-dog $g^4$, and as the backward motion continues, the carrying-wheel is so rotated upon its axis as to bring another receiver in proper position to be forwarded to the revolving collar $c^4$. The receivers $h$ are tubes of suitable length, tapered on the outside for a portion of their length, and slit longitudinally to give them elasticity, and enable them to gripe a blank when forced into the annular collar $c^4$. Each receiver has a set-screw, $h'$, inside, upon which the end of the shank of a blank deposited in the receiver rests. Fig. 3 shows the mode of attaching the receivers to the hub or carrying-wheel $g$, for the purpose of making them capable of rotation upon their own axes.

It will be perceived that the base of each receiver, which is larger in diameter than the rest of it, drops into a cylindrical cavity, $i$, Fig. 3, in the hub, and is maintained therein by a cap, $i^1$. This cap is perforated to allow the receiver to pass through it, and is fastened to the hub by the screws $i^2$, &c. When thus fastened the cap affords a bearing for the annular shoulder formed by the end of the enlarged base of the receiver, and retains the receiver in place without preventing its turning. In order to prevent the blanks from projecting too far from the receiver the yielding spring-finger $k$ is arranged to stand in the center of the socket and meet the blank in its forward motion, and press it home upon the set-screw $h'$ before it is griped.

The drawings exhibit a rotating cutter or milling-tool for shaving the heads. The cutter-shaft is mounted upon levers $l$ and $l^1$, which rock on the driving-shaft $b$, and are operated from the eccentric cam $m$ by means of the rocker-shaft $m^1$ and link $m^2$. For this purpose the cam $m$, Fig. 6, has sufficient throw to draw and hold the cutter completely back from the blank while the carrying-wheel is changing its position, which is effected by that portion of the cam from 1 to 2. From 2 to 3 the cutter is permitted to approach the blank until at the proper distance to commence cutting, in obedience to the impulse imparted to the levers $l$ and $l^1$ by the spiral spring $l^3$. From 3 to 1 the cutter is permitted to very gradually approach the blank as it removes the superfluous metal therefrom. When the cutting operation is completed the cutter is drawn back, and at the same time the cam $e'$ moves the carriage $f$ back and forth, partially rotating the carrying-wheel, and presenting another receiver to the annular collar $c^4$, and so on. The blanks may be deposited in the receivers by hand, or by any suitable automatic contrivance.

It is obvious that by a simple change or reversal in the gearing the blank may be made to revolve swiftly and the cutter slowly, or the common V-tool may be attached to the upper end of the levers $l$ and $l^1$ in place of the revolving cutter, dispensing, of course, in the latter case, with the gears $b^1$ and $b^2$.

What is claimed as new, and desired to be secured by Letters Patent, is—

1. A series of receivers capable of rotation upon their own axes, mounted radially upon a hub arranged in connection with devices by means of which the hub is caused to rotate intermittently, and also to reciprocate in a right line, substantially as shown and described.

2. A receiver capable of rotation upon its own axis, mounted in a hub having an intermittent rotating motion and a reciprocating sliding motion, substantially as described, in combination with a device for imparting to the receiver rotation upon its own axis.

3. A receiver, substantially such as described, mounted upon a hub having the compound motions described, in combination with the revolving collar $c^4$, when the latter is adapted to the double office of pressing the slit end of the receiver upon a screw-blank contained therein, and at the same time communicating a rotary motion to the receiver, substantially as set forth.

4. A receiver, or a series of receivers, mounted upon a hub having the compound motions described, and a device for successively causing each receiver to rotate upon its own axis, and to gripe a screw-blank, in combination with a cutting-tool, whether revolving or otherwise, substantially as herein specified.

5. The combination of the revolving collar and receiver described with a yielding presser-finger, for pressing the blank home in the receiver, and holding it in that position until it can be griped, substantially as described.

AMERICAN SCREW CO.,
EDWIN G. ANGELL, *Prest.*

Witnesses:
GEORGE FULLER,
J. KNIGHT.